United States Patent
Jiang et al.

(10) Patent No.: US 11,012,841 B2
(45) Date of Patent: *May 18, 2021

(54) MATCH BLUETOOTH LOW ENERGY (BLE) MOVING PATTERNS

(71) Applicant: Hewlett Packard Enterprise Development LP, Houston, TX (US)

(72) Inventors: Yurong Jiang, Palo Alto, CA (US); Kyu Han Kim, Palo Alto, CA (US); Puneet Jain, Palo Alto, CA (US); Xiaochen Liu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,324

(22) Filed: Nov. 25, 2019

(65) Prior Publication Data
US 2020/0092699 A1 Mar. 19, 2020

Related U.S. Application Data

(63) Continuation of application No. 15/796,320, filed on Oct. 27, 2017, now Pat. No. 10,516,982.

(51) Int. Cl.
*H04W 4/80* (2018.01)
*H04W 4/02* (2018.01)

(52) U.S. Cl.
CPC ............. *H04W 4/80* (2018.02); *H04W 4/023* (2013.01); *H04W 4/027* (2013.01)

(58) Field of Classification Search
CPC ...................................................... H04W 4/80
See application file for complete search history.

(56) References Cited

U.S. PATENT DOCUMENTS

| 9,696,404 | B1 | 7/2017 | Doyle et al. |
| 10,516,982 | B2* | 12/2019 | Jiang ..................... H04W 4/027 |
| 2010/0268530 | A1 | 10/2010 | Sun et al. |
| 2011/0228098 | A1 | 9/2011 | Lamb et al. |
| 2015/0016712 | A1 | 1/2015 | Rhoads et al. |
| 2015/0327138 | A1 | 11/2015 | Lee et al. |

(Continued)

OTHER PUBLICATIONS

Milan et al., "Mot16: A benchmark for multi-object tracking", arXiv preprint arXiv:1603.00831, 2016, 12 pages.

(Continued)

*Primary Examiner* — Hsinchun Liao
(74) *Attorney, Agent, or Firm* — Brooks, Cameron & Huebsch, PLLC

(57) ABSTRACT

An example system comprising: a processing resource; and a memory resource storing machine readable instructions executable to cause the processing resource to: receive a Bluetooth Low Energy (BLE) signal transmitted from a user device; generate, from the BLE signal, a BLE moving pattern of the user device, wherein the BLE moving pattern is generated at a different entity than an entity that transmits the BLE signal; track an object carrying the user device via visual information of the object such that a visual moving pattern of the object is generated from the tracking; determine the visual moving pattern matches the BLE moving pattern; and assign, responsive to the determination, an identity obtained from the user device to the object being tracked via the visual information.

9 Claims, 7 Drawing Sheets

(56) References Cited

U.S. PATENT DOCUMENTS

| | | |
|---|---|---|
| 2016/0377698 A1 | 12/2016 | Nielsen et al. |
| 2017/0090007 A1 | 3/2017 | Park et al. |
| 2017/0169314 A1 | 6/2017 | Dijkman et al. |
| 2017/0345153 A1* | 11/2017 | Wang ........................ G06T 7/11 |
| 2019/0132696 A1* | 5/2019 | Jiang ..................... H04W 4/023 |

OTHER PUBLICATIONS

Mobile Marketing Association (MMA), "Understanding the Beacon Proximity Landscape", 2015, 19 pages.

Peter Lewis, "How Beacons Technology can Reshape Retail Marketing", Aug. 2016, 8 pages.

Pirsiavash et al., "Globally-optimal greedy algorithms for tracking a variable number of objects", In Computer Vision and Pattern Recognition (CVPR), 2011 IEEE Conference on, pp. 1201-1208. IEEE, 2011.

Qin et al., "Improving Multi-target Tracking via Social Grouping", In Computer Vision and Pattern Recognition (CVPR), 2012 IEEE Conference, 2012, 7 pages.

Ren et al., "Faster R-CNN: Towards Real-Time Object Detection with Region Proposal Networks", In Advances in neural information processing systems, 2015, pp. 91-99.

Retail Next, "Go Beyond Traditional Traffic Counting Unleash the Power of Traffic 2.0."available online at <https://web.archive.org/web/20170929140232/https://retailnext.net/en/home/>, Sep. 29, 2017, 3 pages.

Rezatofighi et al., "Joint Probabilistic Data Association Revisited", In Proceedings of the IEEE International Conference on Computer Vision, pp. 3047-3055, 2015.

Ristani et al., "Performance measures and a data set for multi-target, multi-camera tracking", In European Conference on Computer Vision, Springer, 2016, pp. 17-35.

Santhoshkumar et al., "Context-aware graph modeling for object search and retrieval in a wide area camera network", [63] In Distributed Smart Cameras (ICDSC), 2013 Seventh International Conference on, pp. 1-7.

Seematics, "Seematics: From Sight to Insight", available online at <https://web.archive.org/web/20170726053337/http://www.seematics.com/>, Jul. 26, 2017, 1 page.

Shoppertrak, "Retail Analytics—Retail Traffic Solutions", available online at <https://web.archive.org/web/20171015091734/https://www.shoppertrak.com/>, Oct. 15, 2017, 6 pages.

Silicon Labs, "BLE Proximity Technologies", available online at <https://www.silabs.com/community>, 2017, 7 pages.

Silicon Labs, "Developing Beacons with Bluetooth Low Energy (BLE) Technology", available online at <https://web.archive.org/web/20170712164421/https://www.silabs.com/products/wireless/bluetooth/developing-beacons-with-bluetooth-low-energy-ble-technology>, Jul. 12, 2017, 2 pages.

SkyREC—Business Intelligence and Analytic, "In-Store Retail Transformation", available online at <https://web.archive.org/web/20170904183541/http://www.skyrec.cc/eng.html>, Sep. 4, 2017, 16 pages.

Solera et al., "Tracking social groups within and across cameras", IEEE Transactions on Circuits and Systems for Video Technology, 2016, 13 pages.

Solera et al., "Tracking social groups within and across cameras", IEEE Transactions on Circuits and Systems for Video Technology, vol. 27, No. 3 2017, pp. 441-453.

Tang et al., "Multi-person tracking by multicut and deep matching", In European Conference on Computer Vision, Springer, 2016, pp. 100-111.

Vekariya, D. et al., Implementation of Object Tracking Using Single Camera by Kalman Filter, vol. 2, Issue 6, Jun. 2015, 13 pages.

Wojke et al., "Simple online and realtime tracking with a deep association metric", arXiv preprint arXiv:1703.07402, 2017, 5 pages.

Wongun Choi, "Near-online multi-target tracking with aggregated local flow descriptor", In Proceedings of the IEEE International Conference on Computer Vision, 2015, pp. 3029-3037.

Xovis, "Person Tracking Technology" available online at <https://web.archive.org/web/20171108045347/https://www.xovis.com/en/xovis/ >, Nov. 8, 2017, 5 pages.

Xovis, "We Solve People Flow" available online at <https://web.archive.org/web/20191110012337/https://www.xovis.com/home/>, Nov. 10, 2019, 10 pages.

Yang et al., "An online learned crf model for multi-target tracking", In Computer Vision and Pattern Recognition (CVPR), 2012 IEEE Conference on, pp. 2034-2041.

Yang et al., "Multi-target tracking by online learning of non-linear motion patterns and robust appearance models", In Computer Vision and Pattern Recognition (CVPR), 2012 IEEE Conference on, 2012, pp. 1918-1925.

Yu et al., "Poi: Multiple object tracking with high performance detection and appearance feature", In European Conference on Computer Vision, Springer, 2016, pp. 36-42.

Zhang et al., "Global data association for multi-object tracking using network flows", In Computer Vision and Pattern Recognition, 2008. CVPR 2008. IEEE Conference on, pp. 1-8, IEEE, 2008.

Zheng et al., A discriminatively learned cnn embedding for person re-identification. arXiv preprint arXiv:1611.05666, 2016, Journal of Latex Class Files, vol. 14, No. 8, Aug. 2015, 10 pages.

Zheng et al., "Mars: A video benchmark for large-scale person re-identification", In European Conference on Computer Vision, Springer, 2016, pp. 868-884.

Accenture, available online at <https://web.archive.org/web/20171026081130/https://www.accenture.com/us-en/new-applied-now >, Oct. 26, 2017, 5 pages.

AltBeacon, "The Open and Interoperable Proximity Beacon Specification", available online at <https://altbeacon.org/>, 2 pages.

Altbeacon, available online at <https://web.archive.org/web/20171019232235/http://altbeacon.org/>, Oct. 19, 2017, 2 pages.

Andriyenko et al., "Discrete-Continuous Optimization for Multi-Target Tracking", In Computer Vision and Pattern Recognition (CVPR), 2012 IEEE Conference, 2012, pp. 1926-1933.

Apple iBeacon, available online at <https://web.archive.org/web/20171025022251/https://developer.apple.com/ibeacon/ >, Oct. 25, 2017, 2 pages.

Bazzani et al., "Joint Individual-Group Modeling for Tracking", IEEE transactions on pattern analysis and machine intelligence, vol. 37, No. 4, 2015, pp. 746-759.

Bea inc., available online at < https://www.beainc.com/en/technologies/ >, 6 pages.

Berclaz et al., Multiple object tracking using k-shortest paths optimization, IEEE transactions on pattern analysis and machine intelligence, vol. 33, Np. 9, 2011, pp. 1806-1819.

Bernardin et al., "Evaluating multiple object tracking performance: the clear mot metrics", EURASIP Journal on Image and Video Processing, vol. 2008 No. 1, 2008, pp. 1-10.

Bewley et al., "Simple online and realtime tracking", In Image Processing (ICIP), 2016 IEEE International Conference IEEE, 2016, pp. 3464-3468.

Brent Franson, "Amazon Go Is the Future of Retail", available online at <https://geteuclid.com/2017/01/>, Jan. 26, 2017, 6 pages.

Brickstream, "People Counting & Tracking", 2D and 3D Stereo Vision Sensors for Retail Analytics, available online at < http://www.brickstream.com/ >, 4 pages.

Bridget Johns, "Retail Next: Traffic 2.0 : What's Your Strategy?"available online at <https://web.archive.org/web/20170930101902/https://retailnext.net/en/blog/traffic-2-0/>, Sep. 30, 2017, 2 pages.

Chen et al., "An implementation of faster rcnn with study for region sampling", arXiv preprint arXiv:1702.02138, 2017, 3 pages.

Chen et al., "Multi-object tracking via constrained sequential labeling", In Proceedings of the IEEE Conference on Computer Vision and Pattern Recognition, 2014, pp. 1130-1137, 2014.

Cisco Meraki, "Cloud Managed Security & SDWAN", available online at <https://web.archive.org/web/20171123171311/https://meraki.cisco.com/products/appliances>, Nov. 23, 2017, 8 pages.

Cisco Meraki, "More Power, More Choice, More Protection", available online at <https://web.archive.org/web/20171026053257/https://meraki.cisco.com/>, Oct. 26, 2017, 2 pages.

(56) References Cited

OTHER PUBLICATIONS

Cooper Smith, "How beacons will influence billions in us retail sales", available online at <https://web.archive.org/web/20171012224203/http://www.businessinsider.com/beacons-impact-billions-in-reail-sales-2015-2>, Feb. 9, 2015, 4 pages.
Cooper Smith, "This year, beacons will help big retailers collect data, push coupons, and generate billions in in-store sales", Business Insider, Feb. 2, 2015, 5 pages.
Dehghan et al., "Gmmcp tracker: Globally optimal generalized maximum multi clique problem for multiple object tracking", In Proceedings of the IEEE Conference on Computer Vision and Pattern Recognition, 2015, pp. 4091-4099.
Deloitte, available online at < https://www2.deloitte.com/in/en.html >, 2017, 3 pages.
Donald Reid, "An algorithm for tracking multiple targets", IEEE transactions on Automatic Control, vol. 24, No. 6, 1979, pp. 843-854.
Dynamic time warping, available online at <https://web.archive.org/web/20170917225626/https://en.wikipedia.org/wiki/Dynamic_time_warping >, Sep. 17, 2017, 6 pages.
Euclid Analytics, available online at <https://www.amazon.com/b/ref=as_li_ss_tl?node=16008589011&linkCode=sl2&tag=amazongocom-20&linkId=c841edfd203d324d466de59b6d7febca>, Retrieved in 2019, 5 pages.
Fagot-Bouquet et al., "Improving multi-frame data association with sparse representations for robust near-online multi-object tracking", In European Conference on Computer Vision, Springer, 2016, pp. 774-790.
Fleuret et al., "Multi-camera people tracking with a probabilistic occupancy map", IEEE transactions on pattern analysis and machine intelligence, vol. 30, No. 2, 2008, pp. 267-282.
Fortmann et al., "Sonar tracking of multiple targets using joint probabilistic data association", IEEE journal of Oceanic Engineering, vol. 8, No. 3, 1983, pp. 173-184.
GitHub, "Person Re-identification", in caffe-reid, available online at <https://web.archive.org/web/20180613003831/https://github.com/D-X-Y/caffe-reid>, 2017, 3 pages.
Googie Developers: Beacon, "Eddystone Format", available online at <https://web.archive.org/web/20170714002925/ittps://developers.google.com/beacons/eddystone#beacon_manufacturers>, Jul. 14, 2017, 11 pages.
Gou et al., "Dukemtmc4reid: A large-scale multi-camera person re-identification dataset", In the IEEE Conference on Computer Vision and Pattern Recognition (CVPR) Workshops, Jul. 2017, 10 pages.
Harold W Kuhn, "The hungarian method for the assignment problem", Naval research logistics quarterly, vol. 2, No. 1-2, 1955, pp. 83-97.
He et al., "Deep residual learning for image recognition", In Proceedings of the IEEE Conference on Computer Vision and Pattern Recognition, 2016, pp. 770-778.
Hella Electronics, "Sensors: A Solution for Nearly Everything", available online at, <https://web.archive.org/web/20171201200540/https://www.hella.com/microsite-electronics/en/Sensors-94.html>, Dec. 1, 2017, 1 page.
Henschel et al., "Efficient multiple people tracking using minimum cost arborescences", In German Conference on Pattern Recognition, Springer, 2014, pp. 265-276.
Henschel et al., "Solving multiple people tracking in a minimum cost arborescence", In Applications and Computer Vision Workshops (WACVW), 2015 IEEE Winter, pp. 71-72.
Huang et al., "Speed/accuracy trade-offs for modern convolutional object detectors", arXiv preprint arXiv:1611.10012, 2016, 10 pages.
Inmarket: Shopper Marketing-Location Marketing, available online at <https://web.archive.org/web/20171014103020/https://inmarket.com/>, Oct. 14, 2017, 13 pages.
Irisys: Retail Analytics, People Counting, Queue Management, and Smart Buildings, "Have Confidence in your Data", available online at <https://www.irisys.net/>, 2018, 4 pages.
Jordan Nichols, "Amazon Go: The Customer Data Land Grab", Dec. 13, 2016, 6 pages.
Kim et al., "Multiple hypothesis tracking revisited", In Proceedings of the IEEE International Conference on Computer Vision, 2015, pp. 4696-4704.
Kuo et al., "How does person identity recognition help multi-person tracking?", In Computer Vision and Pattern Recognition (CVPR), 2011 IEEE Conference on, 2011, pp. 1217-1224.
Lance Looper, "How to Determine Bluetooth BLE Beacon Proximity", available online at <https://www.silabs.com/community/blog.entry.html/2016/07/11/how_to_determineblu-q8l7>, Nov. 7, 2016, 5 pages.
Leal-Taixe et al, "Learning an image-based motion context for multiple people tracking", In Proceedings of the IEEE Conference on Computer Vision and Pattern Recognition, pp. 3542-3549, 2014.
Li et al., "Learning to associate: Hybridboosted multi-target tracker for crowded scene", In Computer Vision and Pattern Recognition, 2009. CVPR 2009. IEEE Conference on, pp. 2953-2960.
Li, X. et al., A Multiple Object Tracking Method Using Kalman Filter, Proceedings of the 2010 IEEE, Jun. 20-23, 2010, 5 pages.
Liu et al., "Ssd: Single shot multibox detector", In [49] European Conference on Computer Vision, Springer, 2016, pp. 21-37.
Maesschalck et al., "The Mahalanobis distance", Chemometrics and Intelligent Laboratory Systems, vol. 50, Issue 1, 2000, pp. 1-18.
Mazzon et al., "Detection and tracking of groups in crowd", In Advanced Video and Signal Based Surveillance (AVSS), 2013 10th IEEE International Conference on, pp. 202-207.
Milan et al., "Continuous energy minimization for multi-target tracking", IEEE transactions on pattern analysis and machine intelligence, vol. 36, Issue 1, Jan. 2014, pp. 58-72.
Milan et al., "Detection- and Trajectory-Level Exclusion in Multiple Object Tracking", In Proceedings of the IEEE Conference on Computer Vision and Pattern Recognition, pp. 3682-3689, 2013.
Leal-Taixe et al., "MOTChallenge 2015: Towards a Benchmark for Multi-Target Tracking", Apr. 8, 2015, pp. 1-15.
mod.cam, "See More Do More", available online at <https://web.archive.org/web/20171012091730/https://www.modcam.com/>, Oct. 12, 2017, 4 pages.
Swirl, "Enabling Retailers to Get More From Every Shopper Visit" available online at <https://web.archive.org/web/20171019105222/http://www.swirl.com/>, Oct. 19, 2017, 5 pages.
Swirl, "How It Works: The Power of Mobile Presence", available online at <https://web.archive.org/web/20171005071833/http://www.swirl.com/how-it-works/>, Oct. 5, 2017, 2 pages.

\* cited by examiner

452

|  | OBJECT 442-1 | OBJECT 442-2 |
|---|---|---|
| ID 454-1 | 0.6 | 0.4 |
| ID 454-2 | 0.5 | 0.5 |

|  | OBJECT 442-1 | OBJECT 442-2 |
|---|---|---|
| ID 454-1 | 0.6 +0.1 | 0.4 + 0.9 |
| ID 454-2 | 0.5 + 0.7 | 0.5 + 0.3 |

FIG. 4D

MATCH BLUETOOTH LOW ENERGY (BLE) MOVING PATTERNS

BACKGROUND

A Bluetooth Low Energy (BLE) device may transmit and/or receive a BLE signal with other devices. A BLE device is a beacon sensor device that uses BLE technology. For example, a BLE communicator as a beacon sensor device may facilitate connection with network devices by sending advertisement data frames.

BRIEF DESCRIPTION OF THE DRAWINGS

FIGS. 4A-4D illustrate examples of matching BLE moving patterns consistent with the disclosure.

DETAILED DESCRIPTION

Example implementations relate to matching Bluetooth Low Energy (BLE) moving patterns. Matching BLE moving patterns may include tracking an object. Tracking (e.g., and/or a "track") may include obtaining a series of information of an object (e.g., person) present in a particular location. For example, tracking may be utilized to provide information of a person (e.g., customer) who enters and is present in a store for a particular duration. The information obtained from tracking may include a location of the person being tracked and/or a moving pattern of the person. The information may further provide distinction among people who are simultaneously present in the store within a distance. In some examples, the tracking may not only be utilized to provide information with regards to customer experience and/or business performance, but also reduce cost associated with a store maintenance (e.g., by enabling cashier-less and/or grab-and-go checkout). As such, improving accuracy of the tracking may improve practicality of such a concept.

Accordingly, some examples are directed to matching BLE moving patterns. The BLE tracking disclosed herein may provide practical means of utilizing a BLE technology in tracking of an object. A system suitable for the BLE tracking may include a memory resource, and a processing resource to execute executable instructions stored in the memory. For example, the processor can execute executable instructions stored in the memory to receive a BLE signal transmitted from a user device, generate, from the BLE signal transmitted from the user device, a BLE moving pattern of the user device, and track an object carrying the user device via visual information of the object such that a visual moving pattern of the object is generated from the tracking. In this example, the BLE moving pattern is generated at a different entity than an entity that transmits the BLE signal. Further, the processor can execute executable instruction stored in the memory to determine the visual moving pattern matches the BLE moving pattern, and assign, responsive to the determination, an identity obtained from the user device to the object being tracked via the visual information.

Figure 1:
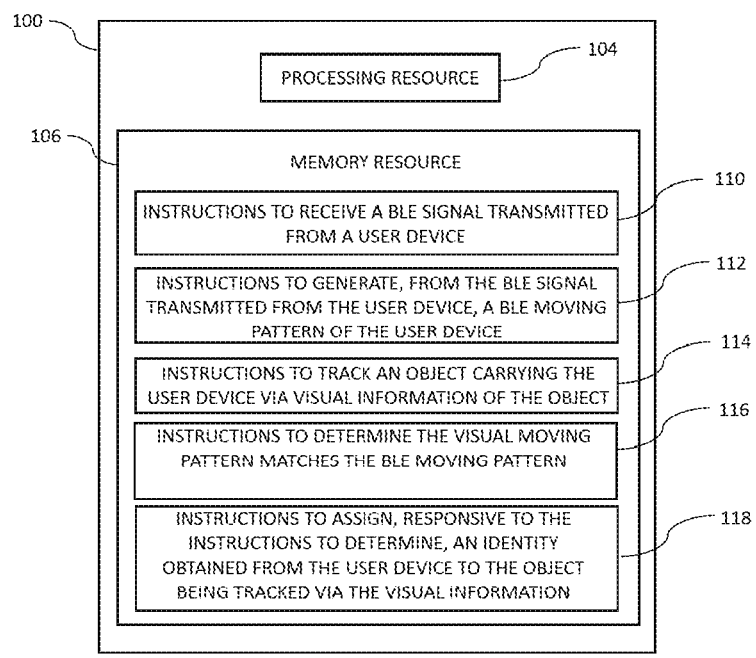
FIG. 1 illustrates an example of a system for matching Bluetooth Low Energy (BLE) moving patterns consistent with the disclosure.

FIG. 1 illustrates an example of a system 100 for matching Bluetooth Low Energy (BLE) moving patterns consistent with the disclosure. In some examples, the system 100 can include a memory resource 106 that can be utilized to store instructions 110, 112, 114, 116, 118, which can be executed by a processing resource 104 to perform functions described herein.

A processing resource 104 may be a Central Processing Unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 110, 112, 114, 116, 118. As an alternative, or in addition to retrieving and executing instructions 110, 112, 114, 116, 118, processing resource 104 may include an electronic circuit comprising a number of electronic components for performing the operations of the instructions 110, 112, 114, 116, 118 in the memory resource 106. With respect to the executable instruction representations or boxes described and shown herein, it should be understood that part or all of the executable instructions 110, 112, 114, 116, 118, and/or electronic circuits included within one box may be included in a different box shown in the figures or in a different box not shown.

Memory resource 106 may be any electronic magnetic, optical, or other physical storage device that stores executable instructions 110, 112, 114, 116, 118. Thus, memory resource 106 may be, for example, Random Access Memory (RAM), an Electrically-Erasable Programmable Read-Only Memory (EEPROM), a storage drive, an optical disc, and the like. The executable instructions 110, 112, 114, 116, 118 may be stored on the memory resource 106. Memory resource 106 may be a portable, external or remote storage medium, for example, that allows the system to download the instructions 110, 112 from the portable/external/remote storage medium. In this situation, the executable instructions 110, 112, 114, 116, 118 may be part of an "installation package". As described herein, memory resource 106 may be encoded with executable instructions 110, 112, 114, 116, 118 for remote device.

In some examples, the memory resource 106 may include instructions 110 executable to receive a BLE signal transmitted from the user device. In some examples, communication between the system 100 and the user device is unidirectional. As used herein, a 'unidirectional' communication may refer to mechanisms of receiving and transmitting signals between two or more signaling devices, in which at least one of the signaling devices transmits a signal to other devices without having to receive a signal from the other signaling devices and/or at least one of the signaling devices receives a signal from the other devices without having to transmit a signal to the other signaling devices. In some examples, the system 100 may receive the signals and the user devices may transmit the signals without receiving those.

Unidirectional communication can reduce latencies associated with transmitting and receiving signals by reducing (e.g., eliminating) transmissions. For instance, for a connection among devices that transmit and receive BLE signals, a BLE signal transmission may be interfered with by other types of signal transmissions (e.g., Wireless local area network (WLAN) transmission) since the BLE signal transmissions have lower transmission power (e.g., 0 dBm compared to 15 dBm of the WLAN transmission). As such, despite certain aspects of the BLE technology (e.g., negligible power consumption and/or technology being generalized, for example, via a smartphone), utilizing the technology may not be practical unless communication among signaling devices (e.g., BLE devices) provides a reduced latency. As such, a unidirectional communication mechanism (e.g., a BLE signal from a user device to a system 100) as provided in the present disclosure may enable a practical use of the BLE technology in tracking and identifying an object.

The system 100 may be utilized to detect, track, and/or identify a customer who enters and is present in a store (e.g., retail store). For example, a plurality of images may be obtained using a camera and/or a plurality of cameras, and BLE signals may be received using a BLE receiver installed within the store. As such, when the customer enters the store, the customer may be detected and tracked not only by a camera and/or a plurality of cameras, but also by a BLE signal that is transmitted from a user device that the customer carries.

A particular location of a plurality of cameras and/or BLE receivers may be known to the system 100 such that the system 100 may utilize the known location in improving accuracy of detecting, tracking, and identifying of the customer. In some examples, a camera that captures (e.g., takes) an image may further be capable of receiving BLE signals to further improve accuracy of tracking and identifying an object.

In some examples, the memory resource 106 may include instructions 112 executable to generate, from the BLE signal transmitted from the user device, a BLE moving pattern of the user device. For example, the user device may continuously and/or periodically transmit the BLE signals to the system 100, and the system 100, via the instructions 112, may continuously and/or periodically determine signal strengths of the received BLE signals. As used herein, continuously can include transmitting signals without meaningful breaks. As used herein, periodically can include transmitting signals per a particular time (e.g., 1 transmission per 1 second). As such, the changes may be utilized to provide an estimation of an object's (e.g., the customer's) actual moving pattern, which may be a BLE moving pattern (e.g., the estimation). In some examples, the signal strengths may be a received signal strength indication (RSSI) of the BLE signals.

In some examples, the BLE moving pattern is generated at a different entity than an entity that transmits the BLE signal. For example, the BLE moving pattern may be generated at the system 100 when the BLE signal is transmitted from the user device. Stated differently, the user device that transmits the BLE signal may lack means to generate the BLE moving pattern by its own. Generating the BLE moving pattern (e.g., or other measurements associated with an entity that transmits a BLE signal) at a different entity can reduce latencies associated with obtaining the BLE moving pattern. For example, a user device, to generate a BLE moving pattern (e.g., or other measurements associated with a BLE signal) of its own moving pattern, may have to obtain a BLE signal from other devices and/or information of a BLE signal strength of the user device in addition to transmitting the BLE signal. Such additional actions may result in latencies in obtaining and generating the BLE moving pattern; thereby, making a use of the BLE technology impractical in tracking and identifying the object.

In some examples, the memory resource 106 may include instructions 114 executable to track an object carrying the user device via visual information of the object such that a visual moving pattern of the object is generated from the tracking. Visual information may include an image (e.g., including an object) captured by a camera installed at a particular location (e.g., within a store).

An object (e.g., detected within an obtained image) may be assigned a bounding box responsive to being detected. As used herein, a bounding box may refer to a box that entirely encloses the object within the box. In some examples, the bounding box may include the smallest measures (e.g., area) to increase accuracy of tracking the object. As the object moves, the system 100 may track the object's movements by determining changes in, for example, area and/or location of the bounding box. The changes may be utilized to generate the visual moving pattern that estimates object's actual moving pattern.

In some examples, a bounding box may be enlarged and extended to a point where a customer's body is imagined to be present. For example, if a customer's body is partially detected (e.g., another portion of the body is hidden due to, for example, another object), a width-to-height ratio may be computed (e.g., and/or previously computed and stored) and utilized to extend a bounding box to a point, for example, where the customer's foot is estimated to be present.

In some examples, the memory resource 106 may include instructions 116 executable to determine the visual moving pattern matches the BLE moving pattern. Further, the memory resource 106 may include instructions 118 to assign, responsive to the determination, an identity obtained from the user device to the object being tracked via the visual information. In some examples, the identity obtained from the user device may be a universal unique identifier (UUID) of the user device. As such, upon the matching, the UUID of the user device may be assigned to an object determined to be carrying the user device.

In some examples, a particular identity obtained from a user device may be restricted to be assigned to an object when it is determined via a BLE signal received from the user device that the user device is outside of a particular distance from a corresponding BLE receiver that receives the BLE signal from the user device. Stated differently, the identity obtained from the user device may not be assigned to a particular object unless the user device is within a particular distance from a corresponding BLE receiver.

In some examples, matching the visual moving pattern to the BLE moving pattern may be expressed in terms of a probability, as described herein. As such, the system 100 may further include instructions executable to adjust (e.g., update) a probability as both the visual moving pattern and the BLE moving pattern are being updated as well.

Figure 2:
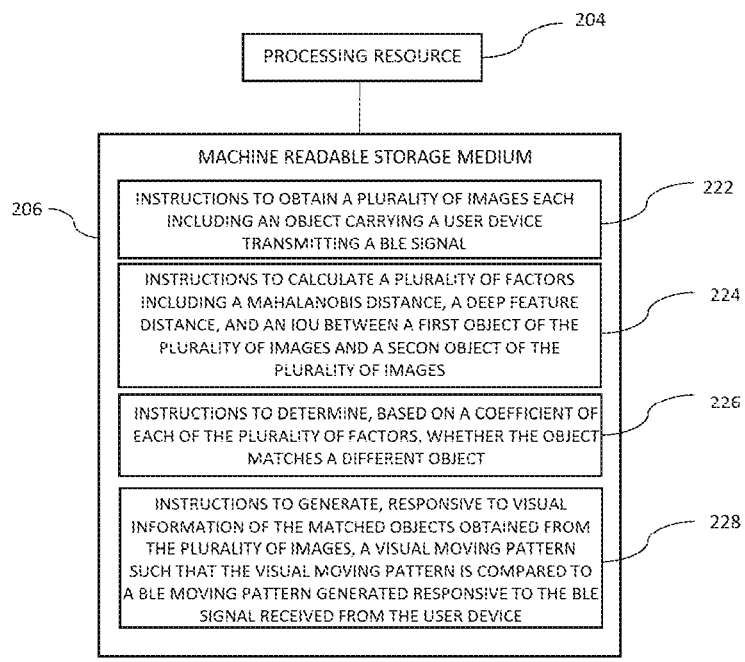
FIG. 2 illustrates a diagram of an example of a non-transitory machine-readable medium and processor for matching BLE moving patterns consistent with the disclosure.

FIG. 2 illustrates a diagram of an example of a non-transitory machine-readable medium 206 and processor 204 for matching BLE moving patterns consistent with the disclosure. In some examples, a machine-readable storage medium 206 may be utilized to store instructions 222, 224, 226, 228, that can be executed by a processing resource 204 to perform functions described herein.

A processing resource 204 may be a CPU, microprocessor, and/or other hardware device suitable for retrieval and execution of instructions stored in a machine-readable storage medium 206. In some examples, the processing resource 204 can be coupled to the machine-readable storage medium 206 via a connection. The connection can be a physical or wireless communication connection. In the particular example shown in FIG. 2, processing resource 204 may receive, determine, and send instructions 222, 224, 226, 228. As an alternative, or in addition, to retrieving and executing instructions 222, 224, 226, 228, processing resource 204 may include an electronic circuit comprising a number of electronic components for performing the operations of the instructions 222, 224, 226, 228 in the machine-readable storage medium 206. With respect to the executable instruction representations or boxes described and shown herein, it should be understood that part or all of the executable instructions 222, 224, 226, 228, and/or electronic circuits included within one box may be included in a different box shown in the figures or in a different box not shown.

Machine-readable storage medium 206 may be any electronic, magnetic, optical, or other physical storage device that stores executable instructions 222, 224, 226, 228. Thus, machine-readable storage medium 206 may be, for example, RAM, an EEPROM, a storage drive, an optical disc, and the like. The executable instructions 222, 224, 226, 228 may be stored on the machine-readable storage medium 206. Machine-readable storage medium 206 may be a portable, external or remote storage medium, for example, that allows the system to download the instructions 222, 224, 226, 228 from the portable/external/remote storage medium. In this situation, the executable instructions 222, 224, 226, 228 may be part of an "installation package". As described herein, machine-readable storage medium 206 may be encoded with executable instructions 222, 224, 226, 228 for remote device configurations, as described herein.

Although the following descriptions refer to a single processing resource 204 and a single machine-readable storage medium 206, the descriptions may also apply to a system including multiple processing resources and multiple machine-readable storage mediums. In such examples, the medium 206 may be distributed across multiple machine readable storage mediums and multiple processing resources. Put another way, the instructions executed in the medium 206 may be stored across multiple machine-readable storage mediums and executed across multiple processing resources, such as in a distributed or virtual computing environment.

In some examples, the machine-readable storage medium 206 can include instructions 222 executable to obtain a plurality of images each including an object carrying a user device transmitting a BLE signal. The plurality of images may be obtained from a camera. In some examples, the plurality of images may be obtained from a plurality of cameras located in a particular location (e.g., a retail store). As such, the plurality of images may include different backgrounds as the plurality of cameras may take different views of the location.

The plurality of images may be taken, for example, by a camera or a plurality of cameras over a particular duration. That is, at least one of the plurality of images may indicate an object in a different time that an object indicated by other images. As such, from analyzing the plurality of images, an object's movement may be determined and tracked. Determining whether two objects each included in two different images are the same object may be based on a plurality of factors, as described herein.

In some examples the instructions 222 may further include instructions executable to calculate a plurality of factors including a Mahalanobis distance, a deep feature distance, and an intersection-over-union (IOU) between a first object of the plurality of images and a second object of the plurality of images. An example Mahalanobis distance can be represented by a function. For example:

$$m(i,j)=(d_i-p_j)^T S_j^{-1}(d_i-p_j) \qquad \text{(Equation 1)}$$

The Mahalanobis distance can be m(i,j), a detection measurement of an object i, can be $d_i$, a projected measurement of an object j, can be $p_j$, and a covariance matrix projection can be $S_j$. Each measurement (e.g., detection measurements and projected measurements) can include a plurality of parameters such as coordinates of a center of a bounding box (e.g., of an object), height of the bounding box, and an aspect ratio of the bounding box (e.g., ratio of a width to a height of the bounding box). As such, measurements of the detected object (e.g., an object i) and the projected object (e.g., an object j) may include parameters such as (x, y, ratio, h). The projected object j may be an object projected (e.g., predicted) using the Kalman filter. As used herein, the Kalman filter is an model that uses a measurement (e.g., or a series of measurements) observed over time and produces estimates of unknown variables that may be more accurate than those based on a single measurement. In this example, the Kalman filter may be a standard Kalman filter with constant velocity motion and linear observation model. In some examples, a threshold for the Mahalanobis distance may be a 95 percent confidence interval computed from the inverse $X^2$ distribution.

A deep feature distance between a first object and a second object may be based on a cosine similarity between visual information of the first object and the second object. An example deep feature distance can be represented by a function. For example:

$$df(i,j)=\min(1-f_i^T f_k^j | f_k^j \in F_j). \qquad \text{(Equation 2)}$$

The deep feature distance can be df (i, j), the deep feature vector $f_i$, where an absolute value of the deep feature vector $f_i$ may be 1. Further, a particular quantity of deep features may be stored in a gallery F (e.g., 100 deep features). Practically, a threshold of the deep feature distance may be 0.2.

An example IOU can be represented by a function. For example:

$$u(i,j)=1-o(i,j). \qquad \text{(Equation 3)}$$

The IOU can be u(i, j), which may be ranging from 0 to 1, and o(i, j) can an overlapping percentage between bounding boxes of the detected object and the projected object. For example, an overlapping percentage may be calculated based on a ratio of an overlapping area between the bounding box of the detected object i and the bounding box of the projected object j to an area of the bounding box of the detected object i. Each of the plurality of factors may be assigned a particular coefficient, which may be adjusted responsive to a variety of circumstances.

Collectively utilizing more than one factor (e.g., Mahalanobis distance, deep feature distance, and IOU) can result in increased accuracy in detecting and tracking in a plurality of circumstances. For example, Mahalanobis distance may not be feasible as motion uncertainty increases, deep feature distance may not be feasible when objects becomes visually indistinguishable, and IOU may not be feasible when objects are detected for less than a particular times. As such, by dynamically adjusting which factor would play a role in detecting and tracking an object, the collective utilization of factors may provide accurate detecting and tracking in a variety of circumstances, in which one of the factors may not be feasible.

In some examples the instructions 222 may further include instructions executable to determine, based on each of the particular coefficients, that the object matches a different object. For example, if a coefficient of a first factor is greater than a coefficient of a second factor, then the matching may be relied on the first factor more than the second factor. The particular coefficient of each of the plurality of factors (e.g., including the Mahalanobis distance, the deep feature distance, and the IOU) may be adjusted, for example, responsive to a variety of circumstances.

In some examples, each of the particular coefficients (e.g., of each of the plurality of factors) may be further adjusted when objects (e.g., objects determined to be matching to each other) appear in at least a portion of the plurality of images for more than a threshold quantity of times. As used herein, a threshold may refer to a point at which the particular coefficients may be adjusted differently. For example, when objects appear for more than 4 times, coefficients of the plurality of factors may be adjusted such that each of the plurality of the particular coefficients has a same value. In this example, assuming that a sum of all coefficients is 1, each coefficient of three factors may be assigned 0.333 such that each coefficient of the three factors equally influences the matching.

In some examples, each of the particular coefficients may be further adjusted when objects (e.g., that are determined to be matching to each other) appear in at least a portion of the plurality of images for less than a threshold quantity of times (e.g., 4 times). For example, coefficients of the plurality of factors may be adjusted such that a coefficient (e.g., 0.8) of the deep feature distance becomes greater than a coefficient (0.2) of the Mahalanobis distance. In this example, the matching may rely more on the deep feature distance than on the Mahanalobis distance. Further, a coefficient of the IOU may be set to zero (such that the matching does not rely on the IOU) since the IOU may not be feasible when there are too few images to be compared.

In some examples, a set of objects may be assigned a particular status responsive to a variety of circumstances. An "initial" status may be assigned to an object that is newly detected, and not matched to other objects yet. A "confirmed" status may be assigned to a set of objects when a quantity of the set of objects (e.g., a number of objects) that are determined to be matching to each other exceeds a threshold quantity of objects. For example, assuming that a threshold quantity of objects is 3, three objects may be assigned a confirmed status when they are determined to be matching to each other.

An "invalid" status may be assigned to a particular object responsive to a failure of matching the particular object and/or determining that the particular object (e.g., or a set of objects) is moving out of backgrounds corresponding to the plurality of images (e.g., store). For example, assuming that a threshold quantity of times is 3, the particular object may be assigned an invalid status when the particular object fails to being matched three times.

In some examples, the instructions 222 may further include instructions executable to generate, responsive to visual information of the matched objects obtained from the plurality of images, a visual moving pattern such that the visual moving pattern is compared to a BLE moving pattern generated based on a BLE signal received from the user device. For example, a visual moving pattern may indicate that the matched objects are moving away from a camera (e.g., and/or a plurality of camera) for 4 seconds, and moving closer to the camera for next 6 seconds. The BLE moving pattern being compared to the visual moving pattern may show such a pattern as well. For example, the BLE pattern may also indicate that a user device (e.g., corresponding to the matched objects) is moving away from a BLE sensor (e.g., located near and/or within the camera) for approximately 4 seconds (e.g., and/or 3.5~4.5 seconds) and moving closer to the sensor for approximately next 6 seconds (e.g., and/or 5.5~6.5 seconds). As used herein, "approximately" can include a value within a particular margin, range, and/or threshold. Additional, a degree of increasing and/or decreasing signal strength (e.g., RSSI) may be considered in the comparison as well.

Figure 3:
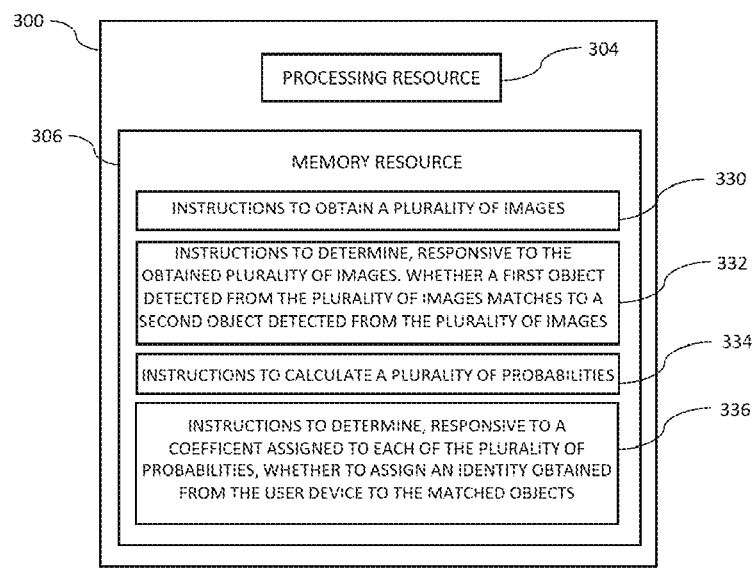
FIG. 3 illustrates an example of a system for matching BLE moving patterns consistent with the disclosure.

FIG. 3 illustrates an example of a system 300 for matching BLE moving patterns consistent with the disclosure. In some examples, the system 300 can include a memory resource 306 that can be utilized to store instructions 330, 332, 334, 336, which can be executed by a processing resource 304 to perform functions described herein. The memory resource 306 and the processing resource 304 may be analogous to the memory resource 106 and the processing resource 104, as described in FIG. 1.

In some examples, the memory resource 306 may include instructions 330 executable to obtain a plurality of images, at least one of the plurality of images including an object carrying a user device. As described herein, a plurality of images may be obtained using a camera or a plurality of cameras, and a BLE signal may be transmitted and received from the user device. As described herein, the BLE signal may be received at a different entity than an entity that transmits the BLE signal. For example, the user device being an entity transmitting the BLE signal may not receive BLE signals from other devices, and the system 300 being an entity receiving the BLE signal may not transmit BLE signals to other devices. Such a unidirectional communication between the system 300 and the user device can reduce latencies associated with transmitting and receiving BLE signals.

In some examples, the memory resource 306 may include instructions 332 executable to determine, responsive to the obtained plurality of images, whether a first object detected from the plurality of images matches a second object detected from the plurality of images. As described herein, matching the first object to the second object may be based on a factor. For example, the factor may include a Mahalanobis distance between two objects, a deep feature distance between two objects, and/or an IOU between two objects. Further, the instructions may include whether matched objects show a similar (e.g., as described in connection with FIG. 2) moving pattern (e.g., visual moving pattern as described in FIG. 1) as indicated by a BLE moving pattern (e.g., moving pattern generated responsive to a BLE signal received from a user device that the matched objects possibly carries).

In some examples, the memory resource 306 may include instructions 334 executable to calculate a plurality of probabilities. The plurality of probabilities may include a first probability that the first object matches to the second object, a second probability that the first object and the second object carries the same user device, and a third probability that a moving pattern of the matched objects matches to a strength change of the BLE signals received from the user device. Each of the plurality of probabilities may have (e.g., may be assigned) a particular coefficient that is proportional to a degree of influence of a respective probability.

In some examples, the first probability may be calculated responsive to a comparison between an average speed of a set of objects and an imaginary speed of the set of objects. The average speed of the set of objects may be calculated from a plurality of images having the same background. For example, the plurality of images having the same background may be images obtained (e.g., taken) from the same camera. As such, in this example, the average speed may be calculated by analyzing how far the object (e.g., a set of objects) has moved within the background and a time period (e.g., 1 second) at which each image has been taken by the same camera.

The imaginary speed may indicate an estimated speed of the set of objects outside background corresponding to the plurality of images (e.g., taken by a plurality of cameras). As such, the imaginary speed may be calculated based on a distance between two cameras and a gap time between particular two objects of the set of objects rather than on a visual information of the set of objects. For example, the set of objects may be lastly detected at a first background (e.g., being taken by a first camera) and firstly detected at a second background (e.g., being taken by a second camera). Assuming that the set of objects (e.g., a person carrying a user device) has moved from the first background to the second background directly, an imaginary speed of the person (e.g., that the set of objects indicate) may be calculated based on an actual distance between the first camera and the second camera and a gap between the first background and the second background. As such, a first portion of the set of objects detected on a first background may be determined to be corresponding to a second portion of the set of objects when the calculated imaginary speed is within a threshold range of the actual speed. An example of the first probability may be represented as a function as follows:

$$Prob(TS_{ij}) = P\left(\frac{Dist(T_{i,cur}, T_{j,prev})}{Speed(T_{j,prev})Time_{gap}} \middle| \mathcal{N}(0, Var(T_{j,prev})^2))\right). \quad \text{(Equation 4)}$$
$$(T_{i,cur}, T_{j,prev})$$

The first probability can be $Prob(TS_{ij})$ and a plurality of objects may be T. For example, objects that are previously tracked and stored may be represented by $T_{j,prev}$ and objects that are currently being tracked and stored may be represented by $T_{i,cur}$.

The second probability can indicate a probability that two different objects carry the same user device. Particularly, the second probability may be calculated based on visual similarities between the two objects. An example of the second probability may be represented as a function as follows:

$$Prob(VIS_{ij}) = P(Dist_{cos}(F(T_i), F(T_j)) | \mathcal{N}(0\sigma_1^2)). \quad \text{(Equation 5)}$$

The second probability can be $Prob(VIS_{ij})$, and $\sigma_1$ may be adjusted responsive to a variety of circumstances. In this example, $\sigma_1$ may be set to 0.2.

The third probability can indicate a probability that one visual moving pattern matches a particular BLE moving pattern. An example of the third probability may be represented as a function as follows:

$$Prob(BLEPROX_i) = P(DTW(Dist_i, BLE_{prox}) | \mathcal{N}(0, \sigma_2^2)). \quad \text{(Equation 6)}$$

The third probability can be $Prob(BLEPROX_i)$, and DTW can be a dynamic time wrapping distance. Although examples are not so limited, the dynamic time wrapping distance may be used instead of the Euclidian distance. Utilizing the dynamic time wrapping distance can improve accuracy in matching a visual moving pattern and a BLE moving pattern, which may be obtained seconds after obtaining the visual moving pattern, $\sigma_1$ may be adjusted responsive to a variety of circumstances. In this example, $\sigma_1$ may be set to 0.15.

In some examples, the three probabilities may be collectively utilized such that each of the three probabilities may influence the matching (e.g., assigning a unique identity to an object) proportional to a value of its coefficient. An example utilizing the three probabilities may be represented as a function as follows:

$$p_{ij} = \alpha Prob(TS_{ij}) + \beta Prob(VIS_{ij}) + (1-\alpha-\beta)Prob \\ (BLEPROX_i). \quad \text{(Equation 7)}$$

The collective probability $p_{ij}$ may be influenced by the first probability $Prob(TS_{ij})$ proportional to a value of a coefficient $\alpha$, the second probability $Prob(VIS_{ij})$ proportional to a value of a coefficient $\beta$, and the third probability proportional $Prob(BLEPROX_1)$ to a value of a coefficient $(1-\alpha-\beta)$.

In some examples, a third coefficient $(1-+-\beta)$ corresponding to the third probability $Prob(BLEPROX_i)$ may be set to zero for a newly detected object, for example, that are not being matched to other objects (e.g., or that have no candidate BLE moving patterns to be compared with). This can reduce latencies associated with calculating the collective probabilities particularly when a visual moving pattern and/or a BLE moving pattern for calculating the third probability is yet to be obtained.

In some examples, the memory resource 306 may include instructions 336 executable to determine, responsive to the particular coefficient of each of the plurality of probabilities, whether to assign an identity obtained from the user device to the matched objects. In this determination, each of the plurality of probabilities influences the matching proportional to the particular coefficient assigned, as described herein.

Figure 4A:
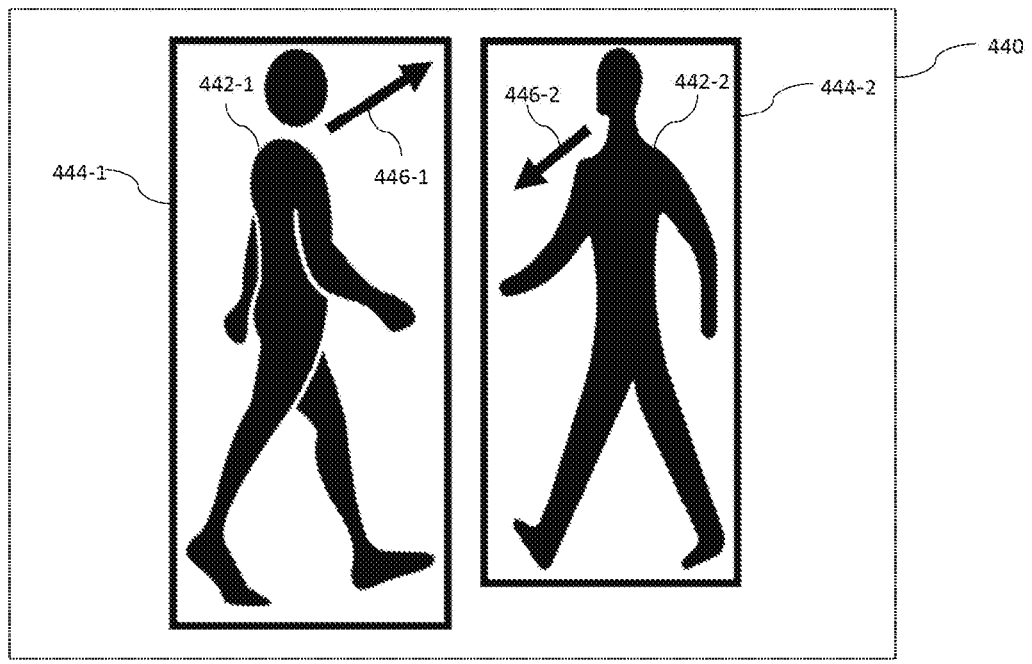

FIGS. 4A-4D illustrates examples of matching BLE moving patterns consistent with the disclosure. FIG. 4A shows two objects 442-1, 442-2 detected from an image 440. As described herein, the image 440 may be obtained from a camera that may be located (e.g., installed) at a particular location of a store (e.g., a retail store). Further, the image 440 may refer to a plurality of images taken from a camera and/or a plurality of cameras and include two objects. In some examples, upon detecting the objects 442-1 and 442-2, bounding boxes 444-1 and 444-2 may be assigned to the object 442-1 and the object 442-2, respectively.

The camera may periodically capture (e.g., 1 capture per 1 second) an image (e.g., an image other than the image 440) such that each object's movement and/or static position may be periodically obtained. For example, a movement of the object 442-1 may be determined responsive to a change of a center point of the bounding box 444-1 over different images taken by the camera. Similarly, a movement of the object 442-2 may be determined responsive to a change of a center point of the bounding box 444-2 over different images taken by the camera. As such, a movement of each object 442-1 and 442-2 may be determined, as shown in FIG. 4A (e.g., indicated by an arrow 446-1 and 446-2, respectively). These movements 446-1 and 446-2 may be analogous to a visual moving pattern, as described herein.

Figure 4B:
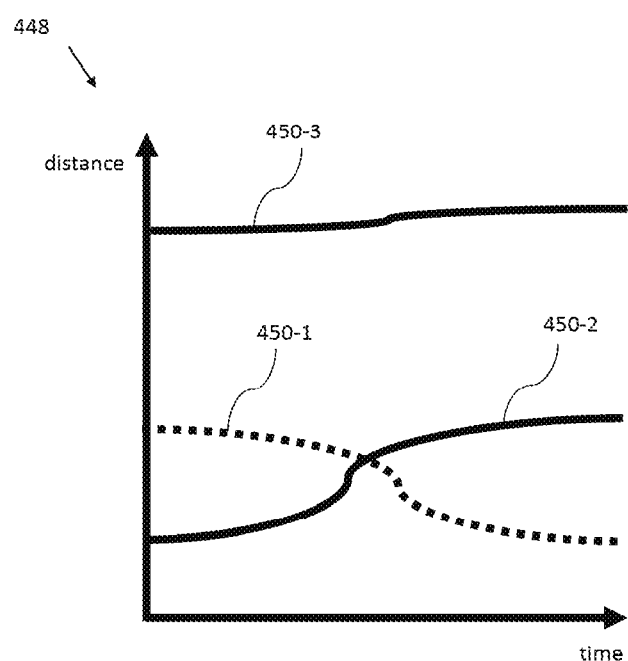

FIG. 4B shows a graph 448 of BLE moving patterns 450-1, 450-2, 450-3 of three objects (e.g., that may or may not correspond to the object 442-1 and/or 442-2) detected by a BLE signal transmitted from each user device. For example, each BLE moving pattern may be generated from determining changes in signal strength (e.g., RSSI) of the continuously and/or periodically received BLE signal. These BLE signals may be utilized to assign a unique identity to each object 442-1, 442-2 detected by the plurality of images 440. As shown in FIG. 4B, a graph shows an estimated distance (e.g., y-axis) of a user device over time (e.g., x-axis).

As shown in FIG. 4B, three BLE moving patterns 450-1, 450-2, 450-3 are generated. At least one of the BLE moving patterns 450-1, 450-2, 450-3 may be compared to the visual moving patterns 446-1, 446-2. Stated differently, at least one of the BLE moving patterns 450-1, 450-2, 450-3 may be selected as a candidate BLE moving pattern to be compared to each visual moving patterns 446-1, 446-2. In some examples, a user device determined to outside of a particular distance from a BLE receiver may not be selected as a candidate user device. For example, as shown in FIG. 4B, a user device corresponding to the BLE moving pattern 450-3 is determined to be relatively far from a BLE receiver as compared to patterns 450-1 and 450-2. As such, a user device corresponding to the BLE moving pattern 450-3 may not be selected as a candidate user device. For example, a user device may not be selected as a candidate user device when the user device is not within 10 meters from the BLE receiver.

FIG. 4C illustrates a probability calculation associated with a set of matched objects carrying a particular user device. The probability matrix 452 may include probabilities that each object matches to each identity obtained from user devices. In some examples, the probabilities included in the probability matrix 452 may not reflect a probability that a visual moving pattern of a particular object corresponds to a particular BLE moving pattern. For example, a BLE moving pattern may be not be available (e.g., obtained) even when the visual information (e.g., including visual moving patterns) is available. As such, probabilities included in the probability matrix 452 may include the first probability (e.g., $Prob(TS_{ij})$ as described in FIG. 3) and the second probability (e.g., $Prob(VIS_{ij})$ as described in FIG. 3), but not the third probability (e.g., $Prob(BLEPROX_j)$ as described in FIG. 3).

As shown in FIG. 4C, the probability matrix 452 shows all possible matching and corresponding probabilities. For example, the probability matrix 452 shows that a probability that the object 442-1 carries a user device having an UUID 454-1 is 60 percent (e.g., 0.6), a probability that the object 442-1 carries a user device having an UUID 454-2 is 50 percent (e.g., 0.5), a probability that the object 442-2 carries a user device having an UUID 454-1 is 40 percent (e.g., 0.4), and a probability that the object 442-2 carries a user device having an UUID 454-2 is 50 percent (e.g., 0.5).

FIG. 4D illustrates further strengthening a probability that a set of matched objects carries a particular user device. A probability matrix 462 may be analogous to the probability matrix 452 as described in FIG. 4C. In some examples, the probability matrix 462 may reflect additional probabilities that were not reflected in the probability matrix 452. For example, as more information is obtained, a BLE moving pattern of each user device may be available. In response, the probability matrix 462 may further include a probability associated with the BLE moving patterns (e.g., $Prob(BLEPROX_j)$ as described in FIG. 3). As such, the probability matrix 462 indicates probabilities further adjusted based on newly available information.

Similar to the probability matrix 452, the probability matrix 462 shows possible matching and corresponding probabilities that are further adjusted. For example, the probability matrix 462 shows that a probability that the object 442-1 carries a user device having an UUID 454-1 is adjusted to 70 percent (e.g., 0.7), and the probability matrix 462 shows that a probability that the object 442-1 carries a user device having an UUID 454-2 is adjusted to 120 percent (e.g., 1.2). The probability matrix 462 shows that a probability that the object 442-2 carries a user device having an UUID 454-1 is adjusted to 130 percent (e.g., 1.3), and the probability matrix 462 shows that a probability that the object 442-2 carries a user device having an UUID 454-2 is adjusted to 80 percent (e.g., 0.8).

When an adjusted probability exceeds a threshold probability, then a UUID may be assigned to a corresponding object. For example, assuming that a threshold probability is 90 percent (e.g., 0.9), the UUID 454-2 may be assigned to the object 442-1 since the probability (e.g., 120 percent) exceeds the threshold. Similarly, the UUID 454-1 may be assigned to the object 442-2 since the probability (e.g., 130 percent) exceeds the threshold.

In the foregoing detailed description of the present disclosure, reference is made to the accompanying drawings that form a part hereof, and in which is shown by way of illustration how various examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, designators such as "N", etc., particularly with respect to reference numerals in the drawings, can, for example, indicate that a number of the particular feature so designated can be included. As used herein, "a number of" a particular thing can, for example, refer to one or more of such things. A "plurality of" is intended to refer to more than one of such things. Multiple like elements may be referenced herein generally by their reference numeral without a specific identifier at the end.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A non-transitory machine-readable storage medium having stored thereon machine-readable instructions to cause a processor to:
   obtain a plurality of images each including an object carrying a user device transmitting a Bluetooth Low Energy (BLE) signal;
   calculate a plurality of factors including a Mahalanobis distance, a deep feature distance, and an intersection-over-union (IOU) between a first object of the plurality of images and a second object of the plurality of images, each of the plurality of factors having a particular coefficient;
   determine, based on each of the particular coefficients, that the object matches a different object; and
   generate, responsive to visual information of the matched objects obtained from the plurality of images, a visual moving pattern such that the visual moving pattern is compared to a BLE moving pattern generated responsive to the BLE signal received from the user device.

2. The medium of claim 1, further comprising instructions executable to adjust, responsive to visual information of each object, a probability that the object of the first of the plurality of images matches the different object of the second of the plurality of images.

3. The medium of claim 1, further comprising instructions to adjust, responsive to the matched objects appearing in at least a portion of the plurality of images for more than a threshold quantity of times, the particular coefficients such that each of particular coefficients has a same value.

4. The medium of claim 1, further comprising instructions executable to adjust, responsive to the matched objects appearing in at least a portion of the plurality of images for less than a threshold quantity of times, the particular coefficient of each of the plurality of factors such that a coefficient of the deep feature distance is greater than a coefficient of the Mahalanobis distance.

5. The medium of claim 4, further comprising instructions executable to adjust a coefficient of the IOU to zero such that the IOU does not influence the matching.

6. The medium of claim 1, further comprising instructions executable to assign an initial status to an object that is newly detected and not matched to at least one of the set of objects.

7. The medium of claim 1, further comprising instructions executable to assign a confirmed status to a set of objects that is determined to be matching to each other when a quantity of the set of objects exceeds a threshold quantity of objects.

8. The medium of claim 1, further comprising instructions executable to assign an invalid status to a first object responsive to a failure to match the first object to other objects of the plurality of images for a threshold quantity of times.

9. The medium of claim 1, further comprising instructions executable to assign an invalid status to a set of objects responsive to a determination the set of object are moving out of a plurality of backgrounds corresponding to the plurality of images.

\* \* \* \* \*